Sept. 6, 1949.　　　　　G. K. CLAIRE　　　　　2,481,084
CAM OPERATED, TRANSVERSELY ENGAGED CLUTCH
Filed Dec. 29, 1945　　　　　　　　　　　　　　2 Sheets-Sheet 1
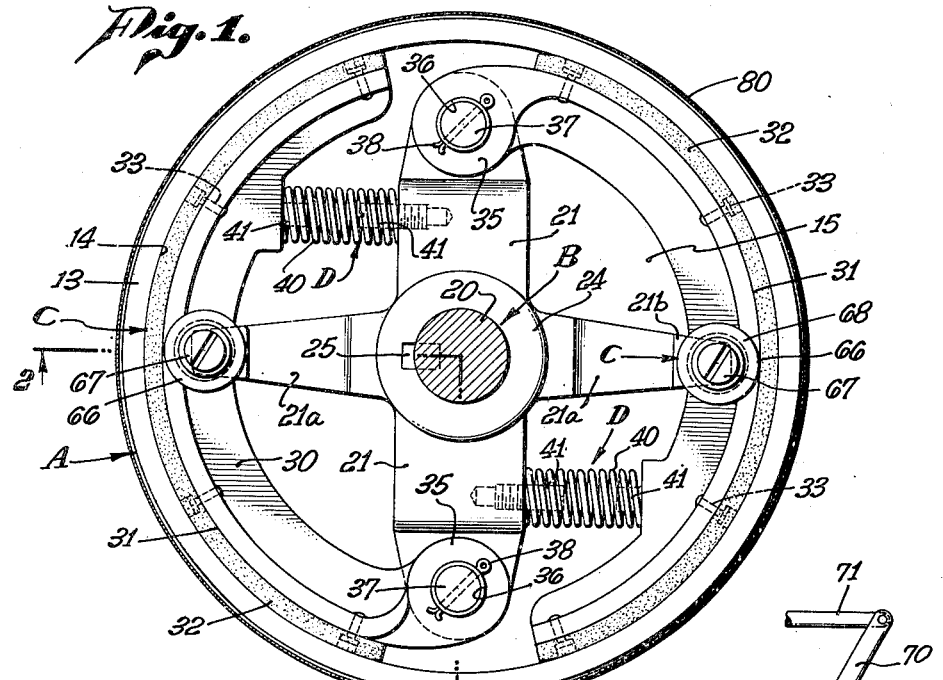
Fig. 1.
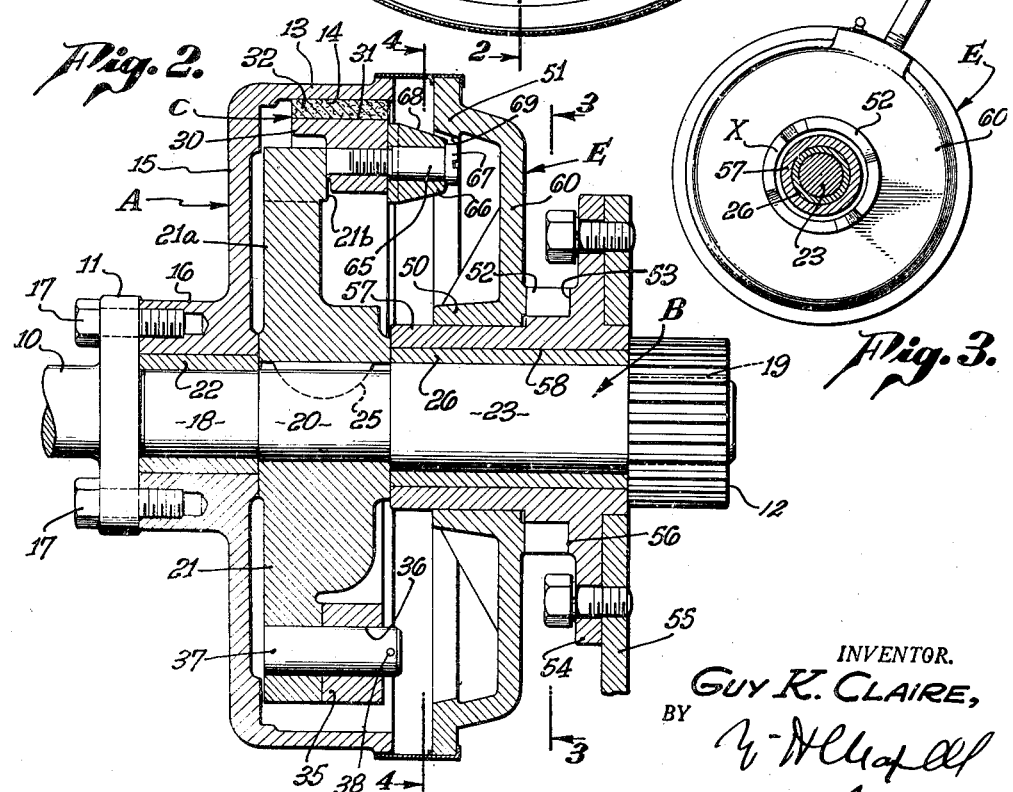
Fig. 2.
Fig. 3.
INVENTOR.
GUY K. CLAIRE,
BY
ATTORNEY.

Sept. 6, 1949.　　　　　　　G. K. CLAIRE　　　　　　　2,481,084
CAM OPERATED, TRANSVERSELY ENGAGED CLUTCH
Filed Dec. 29, 1945　　　　　　　　　　　　　　　2 Sheets-Sheet 2
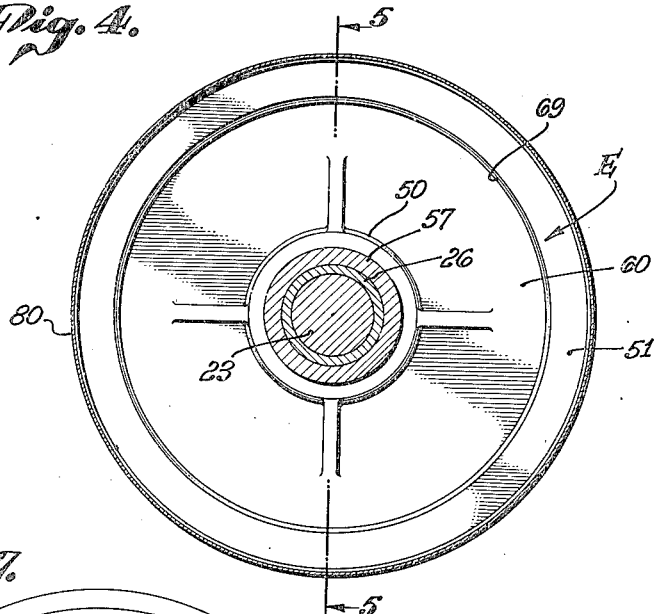
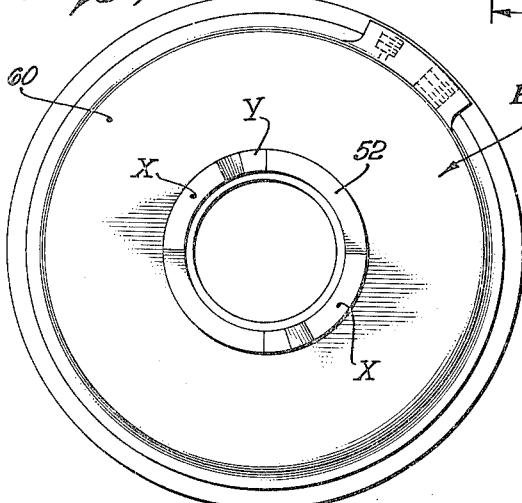
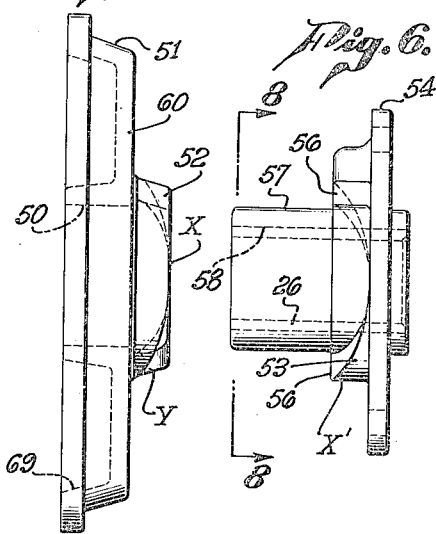
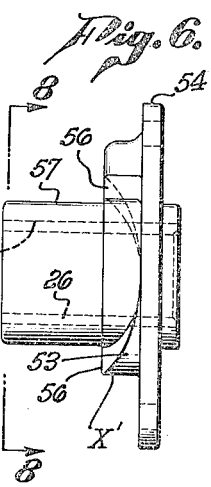
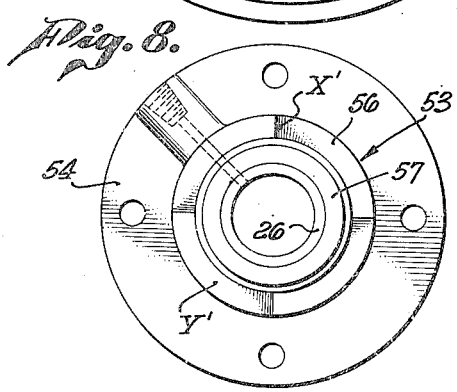
INVENTOR.
GUY K. CLAIRE,
BY
ATTORNEY.

Patented Sept. 6, 1949

2,481,084

UNITED STATES PATENT OFFICE 2,481,084

CAM OPERATED TRANSVERSELY ENGAGED CLUTCH

Guy K. Claire, Rolling Hills, Calif., assignor, by mesne assignments, of one-half to Arthur L. Armentrout, Long Beach, Calif.

Application December 29, 1945, Serial No. 637,832

15 Claims. (Cl. 192—78)

This invention has to do with a clutch and it is a general object of the invention to provide a clutch practical and effective in a wide variety of situations where it is desired to provide a dependable, durable, quick-acting clutch that is simple and easy to operate.

The clutch that I have provided is useful in a very wide variety of situations, for instance, in various machines, units of apparatus of different kinds, agricultural implements, etc. The clutch that I have provided is particularly applicable to situations where operating conditions are severe and where it is essential that the clutch be dependable and long-lived and free of delicate or complicated mechanisms subject to excessive wear or failure.

Another object of my present invention is to provide a clutch of the general character referred to which involves few simple, inexpensive parts. By my invention I have provided a clutch mechanism that involves but few parts, all of which are simple and easy to manufacture, and the entire mechanism is such that it can be easily assembled and is of such character that it can be readily installed for operation.

The various objects and features of my invention will be fully understood from the following detailed description of a typical preferred form and application of the invention, throughout which description reference is made to the accompanying drawings, in which:

Fig. 1 is a detailed transverse sectional view through the mechanism that I have provided, showing the general arrangement of essential parts that occur in the mechanism. Fig. 2 is a longitudinal sectional view taken substantially as indicated by line 2—2 of Fig. 1. Fig. 3 is a reduced end view of the mechanism taken substantially as indicated by line 3—3 on Fig. 2 to show the manner in which it may be connected with an operating rod, or the like. Fig. 4 is an inside view of the control member of the mechanism showing this part viewed as indicated by line 4—4 on Fig. 2, and showing it free of the other parts. Fig. 5 is a side view of the control member being a view taken as indicated by line 5—5 on Fig. 4. Fig. 6 is a side view of the fixed cam part that cooperates with the control member. Fig. 7 is a view of the control member taken substantially the same as Fig. 3, and Fig. 8 is a view of the fixed cam part, being a view taken as indicated by line 8—8 on Fig. 6.

The clutch that I have provided involves, generally, a drive element A, a driven element B, one or more friction shoes C operable to establish driving engagement between the elements A and B, means D normally yieldingly holding the shoes in operating position, and means E for releasing the shoes.

In practice the specific forms of elements A and B may be varied considerably, depending upon the situation in which the clutch is to be used. In the particular case illustrated the drive element A is shown adapted to be coupled to a rotating shaft 10 through a flange 11 of the shaft, while the member B is adapted to drive a pinion 12.

The member A that I provide is essentially a drive drum having an annular shell-like part or rim 13, the inner wall 14 of which is finished so that it is smooth. The rim 13 is suitably supported so that it revolves or rotates on its axis and in the case illustrated it is carried by a radial web 15 projecting from a hub 16, which hub is secured to a driving flange 11 by cap screws 17.

The driven member B in the particular form of the invention shown is essentially a shaft having an inner end portion 18 supported in the hub 16, an outer end portion 19 carrying the pinion 12, and intermediate portions 20 and 23, the portion 20 carrying radially projecting arms 21 which carry the shoes C and radially projecting arms 21ª which act as thrust brackets for the shoes C, and the portions 23 carrying the means E, as I will hereinafter describe. The inner end 18 of the shaft may be supported in the hub 16 through a suitable bushing 22, or the like.

In carrying out my invention I may employ one or more drive shoes C, it being advantageous in most cases to employ two such shoes, in which case the driven member B has two pairs of diametrically opposite radially projecting arms 21 and 21ª. The arms may be formed on or fixed to the shaft in any desired manner. In the case illustrated they are formed separate from the shaft and are carried by a hub 24 fixed on the shaft by a suitable key 25. The structure just described is fixed on the shaft portion 20 so that it occurs within the rim 13 of the drive element A.

The drive shoes C are like arcuate members, each carried by the outer end of an arm 21 to be shiftable into and out of position where they have bearing engagement in the rim 13. In practice I preferably form the shoes so that each has an arcuate or substantially semi-circular body part 30 the outer side or face 31 of which is curved substantially concentric with the inner wall 14 of the rim 13 and carries a friction facing 32 such as is ordinarily employed in brake linings of motor cars and in like situations. The facings 32 are preferably substantially co-extensive with the bodies 30 of the shoes and may be made fast on the bodies by suitable fastening devices 33. Each shoe is mounted by means of the head 35 provided at one end of the body 30 which head has an opening 36 rotatably receiving a pivot member 37 which projects from the arm 21 that supports the shoe. In the particular case illustrated the pivot members 37 are in the form of pins formed separate from the arms and suitably fixed thereto to project in one direction from the arms to carry the shoes and retaining pins 38 are provided to retain the shoes on the members 37.

The means D provided for normally yieldingly holding the shoes in engagement with the rim 13 preferably involves simple helical compression springs 40 arranged to engage and normally bear against the end portions of the shoe bodies 30 remote from the ends that are provided with the heads 35. The ends of the shoe bodies 30 engaged by the springs 40 may be termed the outer ends of the shoes since they are remote from the points of pivotal mounting of the shoes. In the preferred arrangement the shoes project from the two arms in the same rotative direction relative to the axis of the mechanism as clearly shown in Fig. 1, in which case the spring 40 acting on the outer end of each shoe can be advantageously arranged between that shoe and the arm 21 which carries the other shoe. It is preferred, in practice, to provide suitable projections 41 on the arms 21 and the outer end portions of the shoes to hold the springs against displacement. The springs 40 that I provide are under compression so that they normally yieldingly urge the outer end portions of the shoes outward and consequently normally maintain the facings 32 of the shoes in pressure engagement with the wall 14 of rim 13 so driving engagement is established between the members A and B.

The means E that I have provided for releasing the shoes and thus releasing the clutch mechanism involves, generally, a rotatable and axially shiftable control member with a hub portion 50 by which the member is mounted, a ring portion 51 concentric with the hub, and a cam part 52. The means E further includes projections on the shoes to cooperate with the ring 51 and a fixed cam member 53 cooperating with the cam part 52.

In the particular construction that I have shown the fixed cam part 53 has a flange 54 by which it is secured to a fixed support 55. An annular cam 56 projects from the flange 54 and there is an extension 57 projecting beyond the cam 56 to rotatably and slidably support the hub 50. The fixed cam member just described has a central bore 58 which contains a bushing 26 in which the intermediate portion 23 of the driven shaft is rotatably supported.

The hub 50 of the control member is slidable and rotatable on the projecting part 57 of the fixed cam member and a radial flange or web 60 projects from the hub 50 to support the ring portion 51. The ring 51 projects from the periphery of the web 60 toward the shoes which are within the rim 13 so the projections on the shoes which cooperate with the ring can project or extend into the ring without interference from the web 60.

In the preferred form of my invention engageable parts, for example, projections are provided on each drive shoe to cooperate with the ring 51 including a fixed spindle 65 projecting from the outer end portion of the shoe and a roller 66 on the spindle retained on the spindle by a head 67 provided on the outer end of the spindle. Each roller has a tapered outer surface 68 so that the roller is considerably larger at one end than the other and the rollers are arranged on the spindles 65 so that the large ends are in toward the shoes while the small ends project toward the ring 51. The ring 51 has an internal tapered finished part 69 with which the rollers cooperate. When the control member is in the released or normal position as shown in Fig. 2 there is clearance between the rollers and the finished part 69 of the ring 51. However, when the control member is shifted axially in the direction indicated by the arrow in Fig. 2 the tapered part 69 of the ring 51 is brought into engagement with the rollers and as a result of the taper or incline of the rollers and the part 69 the outer end portions of the shoes are moved radially inward causing the shoes to be moved away from the rim 13 against the the resistance of the springs 40. Side thrust develops on the shoes C when the rollers are engaged by the ring 51. This thrust is effectively opposed or borne by the arms 31a which have bearing surfaces 21b which support the shoes. In practice any suitable means may be provided for rotating the control member, for instance, a projecting arm 70 may be provided on the control member and an operating arm 71 may be connected to the arm as shown in Fig. 3 of the drawings.

In accordance with the preferred form of my invention the drum-like structure of the drive element A is open toward the control member that I have just described and the control member is of itself a drum-like structure arranged to oppose or face the element A and it is made sufficiently large to act as a closure for the open end of the drive drum. To maintain a suitable sealed engagement between the control member and the drive element I may provide an axial extension or guard 80 on one of the parts, for instance, on the control member, to overlie the other part so that the parts overlap at all times. Through this construction I effectively shield the working parts of the mechanism against foreign matter that might otherwise find its way into the mechanism.

The cam part 52 of the control member is preferably formed on the outer side of the control member or to project from the web 60 or hub 50 in a direction opposite from that in which the ring 51 projects. The cam part 52 as shown in Figs. 5 and 7 of the drawings has one or more projecting or high parts X and the cam part 56 of the fixed cam element 53 has corresponding cam parts X' with the result that when the control member is in one rotative position it can be moved toward the flange 54 of the fixed cam part so that the cams nest or mesh together. The shape and formation of the cam parts is such that when the control member is rotated the cooperating cam parts cause it to be moved axially out of or away from the nested position just referred to or, in other words, in the direction of the drive member A, and it is this axial movement caused by the cooperation of the cam parts 52 and 56 which causes the ring 51 to engage and cooperate with the projections on the shoes to release the shoes from the rim 13. In the preferred construction I provide the cam 52 on the control member with two diametrically opposite high parts X with intervening depressions or low parts Y, and the cam parts 56 on the fixed cam element are correspondingly shaped or are shaped to suitably cooperate with the cam parts on the control member. The high and low parts X and Y, respectively, of the cam members are preferably flat and are of substantial length circumferentially so that when the high parts X of the cam part 52 engage the high parts X' of the cam part 56 the cams are spread a maximum distance apart and axial forces will not move them together until the high parts X have been deliberately rotated to a position opposite the inclined parts or faces of cam part 56.

From the foregoing description it will be apparent that the mechanism I have provided is such that the springs 40 of means D normally yieldingly urge the drive shoes out so that they normally grip or engage in the drive member A. When the control member of the means E is in its normal or retracted position, as shown in Fig. 2, it does not in any way interfere with the drive shoes but when it is rotated the cam parts that I have described cooperate, causing it to be moved axially so that the part 69 of the ring 51 engages the rollers 66 causing the drive shoes to be released from the drive member. When thus disengaged the entire clutch mechanism comes to rest so there is no movement of parts causing wear. The only moving part is the drive element A which has a substantial bearing engagement on the inner end 18 of the shaft B. When operating the clutch into and out of engagement the rolling action of the rollers 66 on the ring 51 facilitates the movement of the means E so that very little effort or force is needed.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A clutch including a drum, a member concentric with the drum and carrying a shoe, means normally yieldingly holding the shoe in friction engagement with the drum, a ring shiftable axially of said member, a part on the shoe engageable by the ring to release the shoe from the drum, and means acting to shift the ring axially.

2. A clutch including a drum, a member concentric with the drum, a shoe pivotally carried by said member, means normally yieldingly holding the shoe in friction engagement with the drum, a projection on the shoe, a ring shiftable axially of said member and engageable with the projection to release the shoe from the drum, and cam means acting to shift the ring axially.

3. A clutch including a drum, a member concentric with the drum, a shoe pivotally carried by said member, means normally yieldingly holding the shoe in friction engagement with the drum, a projection on the shoe, a rotatable ring shiftable axially of said member and engageable with the projection to release the shoe from the drum, and cam means acting to shift the ring axially including cooperating cam parts one stationary and the other on the ring.

4. A clutch including a drum, a member concentric with the drum, a shoe pivotally carried by said member, means normally yieldingly holding the shoe in friction engagement with the drum, a ring surrounding said member and slidably and rotatably supported to rotate and to shift axially of said member, a part on the shoe engageable by the ring to release the shoe from the drum, and cam means acting to shift the ring axially including a fixed cam part and a cam projection on the ring cooperating with said part when the ring is rotated.

5. A clutch including a drum, a member concentric with the drum, a shoe carried by said member within the drum, means normally yieldingly holding the shoe in friction engagement with the drum, a projection on one side of the shoe, a ring mounted to rotate and to shift axially of said member and drum into engagement with the projection to move the shoe away from the drum, and means for shifting the ring.

6. A clutch including a drum, a member concentric with the drum, a shoe carried by said member within the drum, means normally yieldingly holding the shoe in friction engagement with the drum, a projection on one side of the shoe, a ring mounted to rotate and to shift axially of said member and drum into engagement with the projection to move the shoe away from the drum, and cam means for shifting the ring including a fixed cam part and a cam projection carried by the ring and cooperating with said part.

7. A clutch including a drum, a member concentric with the drum and having radially projecting arms in the drum, shoes pivotally carried by the arms, means normally yieldingly holding the shoes in friction engagement with the drum, axially disposed parts on the shoes, and a ring surrounding said member shiftable axially to engage the said parts and move the shoes away from the drum.

8. A clutch including a drum, a member concentric with the drum and having radially projecting arms in the drum, shoes pivotally carried by the arms and each having an axially disposed part, means normally yieldingly holding the shoes in friction engagement with the drum, and a ring surrounding said member shiftable to engage the said parts of the shoes and move them away from the drum, there being a shoe carried by each arm, and the said means including a spring acting under compression between each shoe and an arm carrying another shoe.

9. A clutch including a drum, a member concentric with the drum and having two diametrically opposite radially projecting arms in the drum, shoes pivotally carried by the arms and each having an engageable part, means normally yieldingly holding the shoes in friction engagement with the drum, and a ring surrounding said member shiftable to engage the said parts of the shoes and move them away from the drum, there being one shoe carried by each arm, and said means including a spring between the outer end of each shoe and the arm carrying the other shoe.

10. A clutch including a drum, a member concentric with the drum, a shoe carried by said member within the drum, means normally yieldingly holding the shoe in friction engagement with the drum, a roller projection on one side of the shoe, a ring mounted to rotate and to shift axially of said member and drum into engagement with the projection to move the shoe away from the drum, and means for shifting the ring.

11. A clutch including a drum, a flange supporting the drum and closing it at one end, a member concentric with the drum and carrying a shoe, means normally yieldingly holding the shoe in friction engagement with the drum, an engageable part projecting from the shoe, a ring at the other end of the drum closing said other end of the drum and shiftable axially of said member and engageable with the said part to release the shoe from the drum, and means acting to shift the ring axially.

12. A clutch including a drum, a member concentric with the drum, a shoe pivotally carried by said member and having an engageable part, means normally yieldingly holding the shoe in friction engagement with the drum, a rotatable ring shiftable axially of said member and engageable with the said part of the shoe to release the shoe from the drum, and cam means acting to shift the ring axially including cooperating cam parts one stationary and the other on the ring, the ring being supported by the stationary cam part.

13. A clutch including a drum, a member concentric with the drum, a shoe carried by said member within the drum, means normally yieldingly holding the shoe in friction engagement with the drum, a projection on one side of the shoe, a ring mounted to rotate and to shift axially of said member and drum into engagement with the projection to move the shoe away from the drum, and cam means for shifting the ring including a fixed cam part and a cam projection carried by the ring and cooperating with said part, the ring being supported by the stationary cam part.

14. A clutch including a drum, a member concentric with the drum, a shoe pivotally carried by said member and having an engageable part, means normally yieldingly holding the shoe in friction engagement with the drum, a rotatable ring shiftable axially of said member and engageable with the said part of the shoe to release the shoe from the drum, and cam means acting to shift the ring axially including cooperating cam parts one stationary and the other on the ring, the ring being supported by the stationary cam part, and said member having a central part rotatably supported in said stationary cam part.

15. A clutch including a drum, a member concentric with the drum, a shoe carried by said member within the drum, means normally yieldingly holding the shoe in friction engagement with the drum, a projection on one side of the shoe, a ring mounted to rotate and to shift axially of said member and drum into engagement with the projection to move the shoe away from the drum, and cam means for shifting the ring including a fixed cam part and a cam projection carried by the ring and cooperating with said part, the ring being supported by the stationary cam part, and said member having a central shaft portion rotatably supported in said stationary cam part.

GUY K. CLAIRE.

REFERENCES CITED

The following references are of record in the file of this patent:

UNITED STATES PATENTS

| Number | Name | Date |
| --- | --- | --- |
| 453,810 | Howe | June 9, 1891 |
| 1,227,475 | Matheeuwissen | May 22, 1917 |
| 2,128,485 | Keller | Aug. 30, 1938 |